United States Patent [19]

Strobl

[11] 4,454,699
[45] Jun. 19, 1984

[54] BRICK FASTENING DEVICE

[76] Inventor: Fred Strobl, 1461 Arthur Dr., Provo, Utah 84601

[21] Appl. No.: 358,347

[22] Filed: Mar. 15, 1982

[51] Int. Cl.[3] .................. F16B 13/02; F16B 13/04; F16B 19/00
[52] U.S. Cl. .................................. 52/585; 403/298; 411/510
[58] Field of Search ............... 52/585; 411/510, 509, 411/508; 24/213 R, 214; 403/298, 292

[56] References Cited

U.S. PATENT DOCUMENTS

| 228,052 | 5/1880 | Frost . | |
| 660,308 | 10/1900 | Pixley | 52/585 |
| 860,927 | 7/1907 | Mann . | |
| 1,809,508 | 6/1931 | Colby | 52/585 |
| 2,236,926 | 4/1941 | Surface . | |
| 2,258,156 | 10/1941 | Cavalieri . | |
| 2,391,298 | 12/1945 | Davis | 411/508 |
| 3,295,097 | 12/1966 | Van Horssen et al. . | |
| 3,295,281 | 1/1967 | Dixon . | |
| 3,412,437 | 11/1968 | Bennett | 411/509 |
| 3,476,008 | 11/1969 | Pearson et al. | 411/508 |
| 3,494,244 | 2/1970 | Wayland | 411/510 |
| 3,510,979 | 5/1970 | Fischer . | |
| 3,641,731 | 2/1972 | Winfree | 52/747 |
| 3,689,075 | 9/1972 | Adelsohn . | |
| 3,883,258 | 5/1975 | Hewson | 403/298 |
| 3,888,055 | 6/1975 | Gallo . | |
| 3,966,339 | 6/1976 | Nemecek | 403/292 |
| 4,040,225 | 8/1977 | Bretone | 52/585 |
| 4,110,949 | 9/1978 | Cambiuzzi et al. | 52/585 |
| 4,159,592 | 7/1979 | Gabriel | 411/508 |
| 4,214,505 | 7/1980 | Aimar | 41/510 |
| 4,270,328 | 6/1981 | Page et al. | 24/213 R |
| 4,318,208 | 3/1982 | Borja et al. | 411/508 |

FOREIGN PATENT DOCUMENTS 1020694  2/1966  United Kingdom ............ 411/510

Primary Examiner—John E. Murtagh
Assistant Examiner—Michael Safavi
Attorney, Agent, or Firm—Willian, Brinks, Olds, Hofer, Gilson & Lione, Ltd.

[57] ABSTRACT

A device for connecting bricks which have apertures to receive the device is provided. A support shaft of the device supports resilient transverse fins which form an interference fit with the aligned apertures of two adjacent bricks. Stop surfaces on the support shaft engage the respective bricks to ensure penetration of both bricks. Flared ends of the device facilitate insertion and centering of the device within the apertures and provide protection for the fins. During insertion, the transverse fins are deflected inward toward the support shaft and longitudinally toward the stop surfaces. After insertion, the fins are biased outward by their resiliency into engagement with the bricks to lock the adjacent bricks together.

4 Claims, 6 Drawing Figures

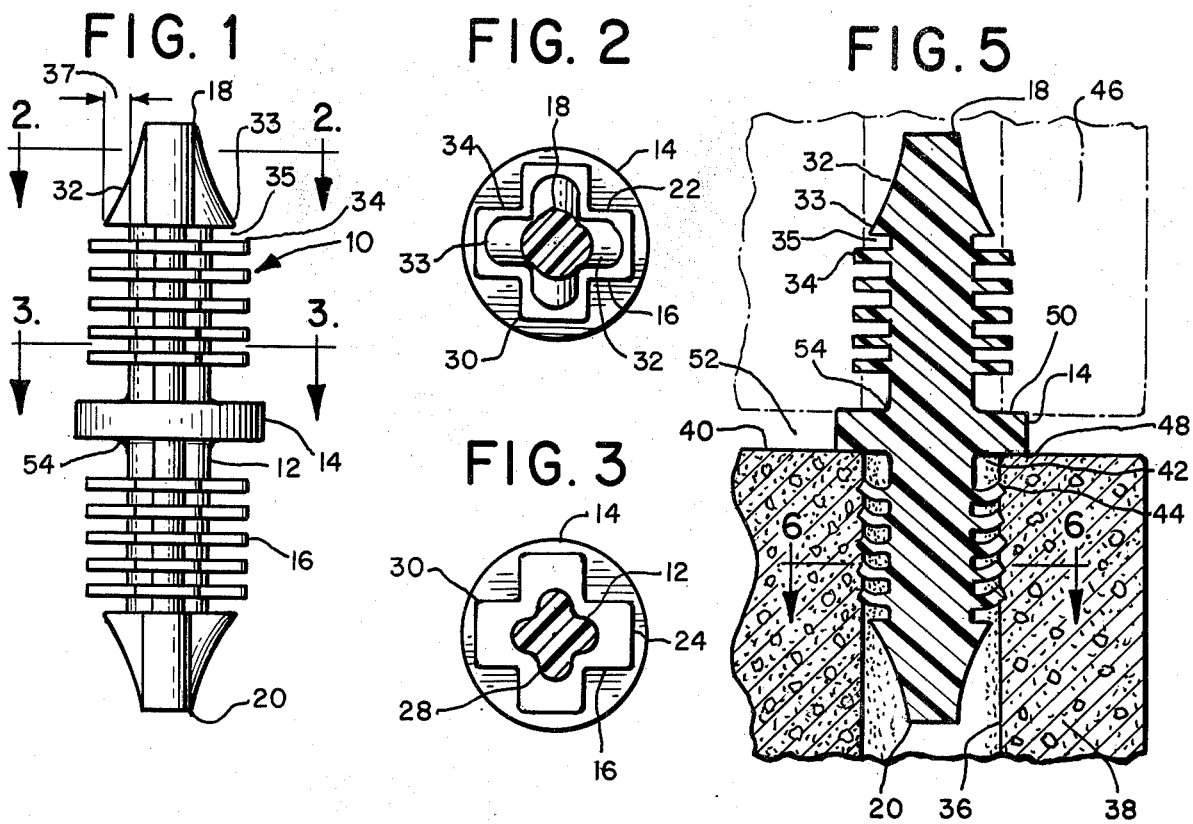
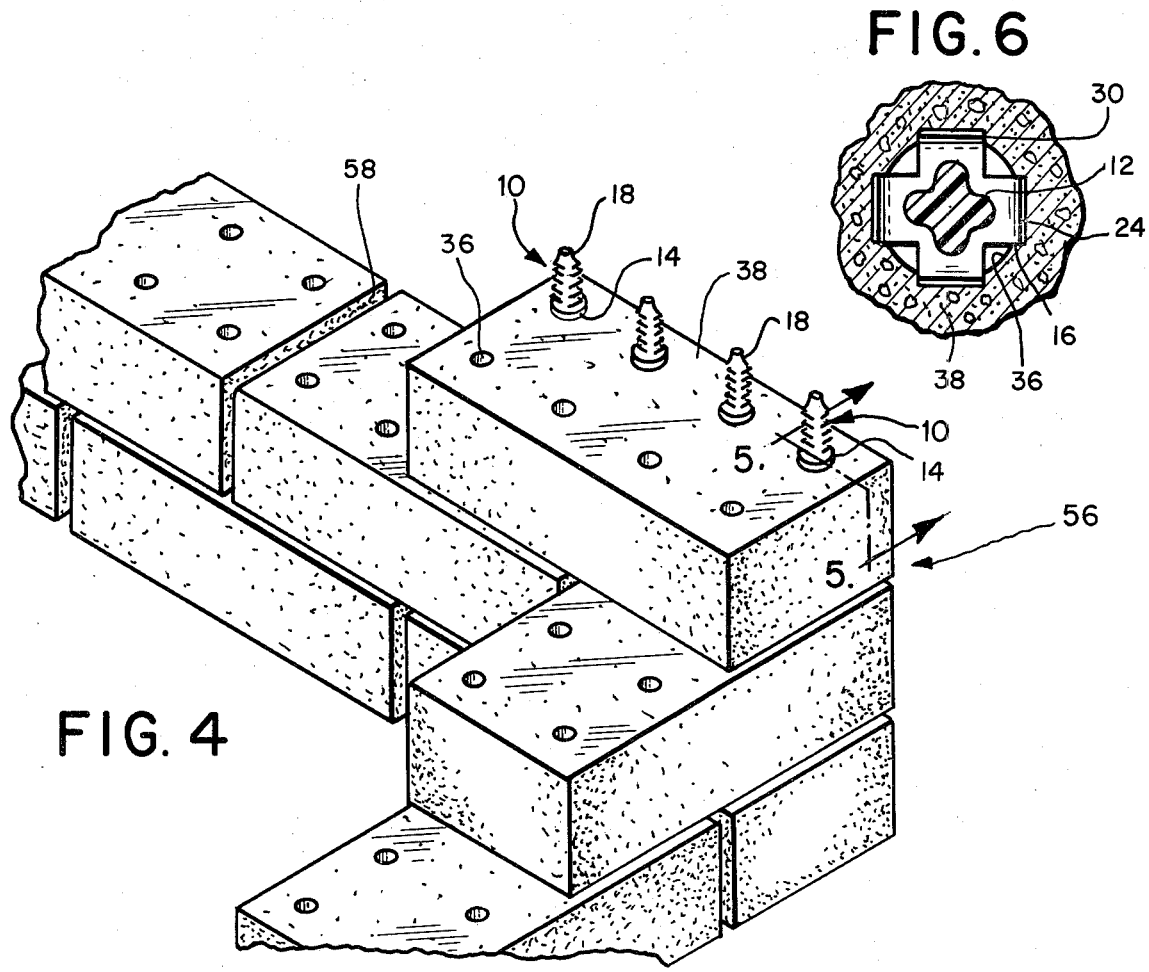

BRICK FASTENING DEVICE

BACKGROUND OF THE INVENTION

The present invention is directed to a brick fastening device and method suitable for use in building construction such as, for example, forming a brick wall or brick pavement.

In typical brick construction, bricks are fastened together by a layer of mortar placed between adjacent bricks as the bricks are "laid" to form a brick structure. Although the resulting structure is strong, durable and attractive, the skill required in mixing the mortar and spacing and aligning the bricks makes such construction expensive and limits its use. Furthermore, this brick construction is slow due to the complexity of the spacing and aligning procedures and the necessity of laying a brick wall in sections. Sagging will occur if the mortar has not hardened sufficiently to support the weight of the overlying bricks.

Various types of alignment and spacing devices have been proposed to improve or simplify brick and mortar construction. For example, U.S. Pat. No. 3,295,281 shows an alignment dowel for use with particularly configured cement blocks. U.S. Pat. Nos. 860,927 and 3,641,731 show spacing lugs and ribs, respectively. However, with each of these proposed devices, mortar is still required for fastening the bricks or cement blocks together; the proposed devices are to be used solely for alignment or spacing.

In contrast to the brick wall constructions just described, children's toy building blocks have been devised which utilize special dowels or pegs for fastening together small wood or plastic blocks as well as for aligning adjacent blocks. Such toy building block construction, as exemplified by U.S. Pat. Nos. 2,258,156 and 228,052, does not require mortar, but such construction is not suitable for fastening together ceramic bricks or concrete blocks to form a full-scale wall or the like.

Moreover, conventional brick and mortar construction does not facilitate drainage or ventilation through a brick wall or pavement as is desirable in some applications. Because the mortar must flow around the perimeter of each brick, drainage or ventilation is usually achievable by the use of specially configured bricks having openings within their perimeters. Such bricks are expensive and may be too weak for some applications.

Accordingly, it is an object of the present invention to provide a brick fastening device which can be used to fasten together bricks, either with or without mortar, to form a structure.

Another object of the present invention is to provide a brick fastening device which provides alignment and spacing of adjacent bricks while providing fastening of the bricks to each other.

It is still another object of the present invention to provide a convenient and economical method of fastening bricks together to form a structure which is immediately rigid.

It is still another object of the present invention to provide an economical method for forming a brick structure in which spaces may be left between bricks to permit drainage or ventilation.

SUMMARY OF THE INVENTION

The present invention is directed to a device and method of fastening bricks together to form a structure, either with or without the use of mortar.

According to this invention, a particular device is provided for use with bricks having apertures formed in their external surfaces to receive the device. The device includes elongated support means which is insertable into the apertures of two adjacent bricks. Stop means extends outward from the support means, intermediate the extremities thereof, to ensure penetration of both bricks. A plurality of resilient transverse fins extend outward from the support means in interference relationship with the adjacent bricks, the fins being larger than the apertures in the bricks. Upon forced insertion of the device into the apertures of the adjacent bricks, the fins are deformed inward and are biased outward by their resiliency into engagement with the bricks to restrain withdrawal of the device.

Preferably, the ends of the device are angled inward to a blunt point along longitudinal ribs for centering the device within an aperture, for breaking any flash which may partially cover the aperture, and for protecting the fins. Additionally, the fins may extend radially from a shaft comprising the support means and may be notched to form separate blades. The blades may be aligned to form longitudinal splines, each consisting of a series of rectangular or rounded transverse blades projecting radially from the shaft. The stop means may be conveniently formed as a cylindrical flange concentric with the shaft and extending radially therefrom to a diameter in excess of the diameter of the apertures. In this embodiment, the stop means can be used to provide spacing between adjacent bricks.

As a result of the present invention, a brick structure may be more easily and more quickly constructed than would be possible with conventional brick and mortar construction. Alignment and spacing of the bricks may be ensured by the spacing of the apertures and the thickness of the stop means, respectively. Because mortar is not necessary with the present invention, the structure is immediately rigid and need not be assembled in sections to avoid sagging. The construction is economical and facilitates drainage or ventilation between the bricks when spacing is provided and mortar is not used.

The invention, together with further objects and attendant advantages, will be best understood by reference to the following detailed description taken in conjunction with the accompanying drawings.

BRIEF DESCRIPTION OF THE DRAWINGS

FIG. 1 is a side elevational view of the device of the present invention;

FIG. 2 is a cross-sectional view taken along the line 2—2 of FIG. 1 showing the longitudinal ribs at one end of the device in section;

FIG. 3 is a cross-sectional view taken along the line 3—3 of FIG. 1 showing the shaft of the device in section;

FIG. 4 is a perspective view of a brick wall structure assembled in accordance with the present invention;

FIG. 5 is a cross-sectional view taken along the line 5—5 of FIG. 4 showing engagement of a brick by the brick fastening device; and FIG. 6 is a cross-sectional view taken along the line 6—6 of FIG. 5 showing engagement of the brick by the fins of the device.

DETAILED DESCRIPTION OF A PREFERRED EMBODIMENT

With reference to the drawings, a brick fastening device made in accordance with the present invention is shown in FIGS. 1 through 3, indicated generally by the numeral 10.

As shown in FIG. 1, the brick fastening device 10 comprises an elongated shaft 12, a transverse central flange 14, and longitudinally spaced transverse fins 16. The transverse fins 16 are arranged symmetrically about the central flange 14 in two series, five fins in each. However, the particular number and symmetry of the fins 16 are merely illustrative and are not essential for the practice of the present invention. One series of the fins 16 is positioned between the central flange 14 and a first end 18, and a second series of the fins 16 is similarly positioned between the central flange 14 and the second end 20.

The central flange 14 is cylindrical, i.e. disc-shaped, and is concentric with respect to the shaft 12 as shown in FIG. 3. The fins 16 are of a particular concentric four-bladed configuration, shaped as though initially round fins were notched at four equi-distant points along their circumferences, as at notch 22, and as though the remaining arcuate perimeter portions were squared to form flat blades 24. Described in another way, each of the fins 16 comprises four similar, generally rectangular blades 24 which extend radially from the shaft 12 at 90 degrees to each other.

The blades 24 of adjacent fins 16 are aligned side by side, in rows, so as to form longitudinal splines. As shown in section in FIG. 3, the shaft 12 has four rounded lobes 28 oriented at 90 degrees to each other. Each lobe 28 serves to support a row of longitudinally spaced blades 24. Although this particular configuration of the shaft 12 is preferred, it will be readily apparent that other support means for the fins 16 could be used. The external corners 30 of the blades 24 may be radiused as shown in FIGS. 2 and 3 or may be square.

For reasons that will be discussed below, the first end 18 is tapered from a blunt point by means of longitudinal ribs 32, which are in alignment with the blades 24. As shown in FIG. 1, the longitudinal ribs 32 curve away from the shaft 12 at the first end 18 with increasing angularity and terminate in a flared portion 33 adjacent the end fin 34. The longitudinal ribs 32 are rounded in section and the flared portion 33 is smaller in end profile than the fins 16, as shown in FIG. 2. The configuration of the second end 20 is the same as that of the first end 18, just described.

Because bricks are extremely sharp and abrasive after firing, the end fin 34 may be sheared from the shaft 12 unless the end fin 34 is adequately protected. Applicant has found that the particular configuration of the longitudinal ribs 32 illustrated provides a suitable means for protecting the end fin 34. A relief 35 has a sufficient depth 37, as measured in a direction radial to the shaft 12, to center the device 10 and to permit the end fin 34 to flex within a protected portion corresponding to the depth 37. If the depth 37 is small, the end fin 34 may shear adjacent the shaft 12.

The fins 16 are made of a tough, resilient material which permits the blades 24 to be bent inward toward the shaft 12, in a direction toward the central flange 14, without breaking. Preferably, the brick fastening device 10 is molded of a single piece of an appropriate plastic, thereby integrating the shaft 12, the central flange 14, the fins 16, and the longitudinal ribs 32 and permitting low manufacturing costs. The preferred material is ultra-high-density polyethylene.

As shown in FIG. 5, one end of the device, for example the second end 20, is forcibly inserted into a substantially cylindrical aperture 36, which is formed in a ceramic brick 38 perpendicular to the brick's external surface 40. The aperture 36 is smaller than the maximum diameter of the fins 16 so as to form an interference fit. When the device 10 is inserted into the aperture 36, the blades 24 are bent longitudinally toward the central flange 14 and inward toward the shaft 12.

The resiliency of the fins 16 biases the blades 24 outward as barbs into engagement with the surface of the aperture 36 of the brick 38 to prevent removal of the device 10 from the brick 38. In addition to protecting the fins 16 as described above, the longitudinal ribs 32 serve to center the device 10 within the aperture 36 and to break away any flash which may partially cover the aperture 36. The outward curving of the ribs 32 facilitates the insertion of the device 10. Because the largest diameter of the ribs 32 is less than the diameter of the fins 16, the ribs 32 do not interfere with the locking engagement of the blades 24.

The longitudinal spacing of the fins 16 permits the blades 24 to deflect independently, allowing the external corners 30 to penetrate the surface of the aperture 36 as shown in FIG. 6. Applicant has found that the fins 16 tend to disable each other if placed too closely together. In the embodiment illustrated, five equally spaced fins 16 tend to break away any loose surface of the aperture 36 and thereafter engage the underlying solid portions of the brick 38 to lock the device 10 in place.

The central flange 14 serves as a stop, thereby ensuring that half of the device 10 protrudes from the brick 38 after insertion. The space 42 between the central flange 14 and the central fin 44 adjacent the central flange 14 is greater than the spaces between the adjacent fins 16 to prevent the central flange 14 from interfering with the longitudinal deflection of the central fin 44 and with the engagement of the brick 38 by the central fin 44. The central flange 14 also serves as a spacer between adjacent bricks, as described below.

Due to the symmetry of the device 10 about the central flange 14, it will be apparent that a second brick 46, shown in phantom in FIG. 5, may be pressed over the protruding first end 18, causing insertion of the shaft 12 into the second brick 46 until the central flange 14 engages the external surface of the second brick 46. The engagement of the second brick 46 by the fins 16 between the first end 18 and the central flange 14 is identical to the engagement of the brick 38 by the similar fins 16 as described above. By that engagement, the device 10 is locked simultaneously in both bricks, thereby locking the two bricks together.

In the embodiment shown, longitudinally spaced flat side surfaces 48 and 50 of the central flange 14 comprise the stop surfaces for the brick 36 and the second brick 46, respectively, as shown in FIG. 5. As indicated by the phantom lines, the space 52 between the brick 36 and the second brick 46 corresponds to the thickness of the central flange 14. Accordingly, the thickness of the central flange 14 may be pre-selected to provide the desired spacing between adjacent bricks. Further, the flange 14 can include small fillets 54 for strengthening the device 10 without affecting the space 52.

As shown in FIG. 4, the brick 38 is generally rectangular in plan view and has a height somewhat less than its width, much as a conventional brick. The apertures 36 comprise passages which extend vertically through the brick 38. Similar passages have been widely utilized to facilitate the use of mortar in conventional brick and mortar construction. The bricks are conveniently extruded of clay, and the passages can be economically formed in the bricks before firing, while the bricks are still "green."

In the construction of a brick structure, such as that generally indicated by the numeral 56, each of the bricks has the configuration of brick 38. Preferably, the bricks are formed with eight regularly spaced apertures 36 as shown in FIG. 4. This number and spacing of the apertures permits each of the bricks to be anchored by 16 units of the device 10 to the adjacent bricks. Further, the number and spacing can be pre-selected to define the space 58 between the ends of adjacent bricks when the bricks are staggered to form flat walls and to permit complex structures having corners, as illustrated by the brick structure 56.

The device 10 can be inserted into the brick 38 by driving, as by a hammer or mallet, or can be inserted by power means when a large brick structure is to be constructed. Mortar or other similar substance can be used in conjunction with the device to close the spaces between the bricks, to provide increased rigidity of the resulting structure, or merely for aesthetic reasons. Alternatively, the structure can be used immediately, no mortar being required because the barb-like effect of the fins locks the bricks together into a rigid structure.

From the foregoing, it should be apparent that a convenient device for fastening together bricks, either with or without mortar, has been disclosed. This device offers the advantage that the resulting structure is immediately rigid and need not be constructed in sections to avoid sagging. A further advantage of the device is that alignment and spacing of the bricks is greatly simplified, eliminating the need for highly skilled bricklayers. The device permits economical construction of brick structures which, if desired, may include spaces between bricks for drainage or ventilation.

Of course, it should be understood that various changes and modifications to the preferred embodiment described above will be apparent to those skilled in the art. For example, the fins need not be notched to form separate blades and need not be symmetrical about a central flange or other stop means. Similarly, the bricks could be of any material or manner of construction, and the device need not be molded of plastic or formed as a single piece. The particular shape and number of the blades and the corresponding lobes of the shaft are merely illustrative of the possible configurations of the fins and support means therefor. Such changes and modifications can be made without departing from the spirit and scope of the present invention, and it is therefore intended that such changes and modifications be covered by the following claims.

I claim:

1. A device for fastening together bricks which have apertures to receive the device, the device comprising:
   elongated support means insertable into the apertures of two adjacent bricks;
   stop means extending outward from the support means, intermediate the extremities thereof, for engaging the adjacent bricks to limit penetration of each of the adjacent bricks by the device and to ensure penetration of both adjacent bricks by the device; and
   a plurality of resilient, longitudinally spaced transverse fins extending radially outward from and concentric with the support means so as to be in interference relationship with the adjacent bricks, the fins each being similarly configured and divided into a plurality of blades which extend radially out from the support means, the blades of adjacent fins being aligned to form longitudinal rows, and being resiliently deformable upon insertion of the support means into the apertures of the adjacent bricks such that the fins are biased outward into engagement with the adjacent bricks to restrain withdrawal of the device from each of the adjacent bricks; the support means comprising a shaft having a plurality of rounded lobes corresponding to the number of blades per fin, each lobe of the shaft being recessed from both sides laterally, and from the end radially, of the blades, and providing support for a row of fins at the central portion of the base of each blade.

2. The device as cited in claim 1 wherein the stop means is a disc-shaped flange having longitudinally spaced surfaces engageable with the adjacent bricks to effect a desired spacing between the adjacent bricks; the flange extending radially outward from and concentric with the support means, the thickness of the flange corresponding to the desired spacing between the adjacent bricks and the flat sides of the flange being engageable with the adjacent bricks.

3. The device as recited in claim 1 which further comprises tapered ends at the extremities of the support means for facilitating insertion and centering of the device with respect to the apertures of the adjacent bricks; each of the tapered ends including longitudinal ribs tapered outward from a blunt point to a flared portion adjacent the fins, the flared portion having an end profile larger than the end profile of the support means but smaller than the end profile of the fins for protection of the fins.

4. The device as recited in claim 3 wherein the tapered ends extend outward from a blunt point to a flared portion adjacent the fins so as to form a relief, the ends having lateral and longitudinal dimensions larger than the support means and smaller than the fins, so as to break away flash within a brick and to protect the fins from abrasion and shearing.

* * * * *